United States Patent [19]

Endo et al.

[11] Patent Number: 5,124,424

[45] Date of Patent: Jun. 23, 1992

[54] POLYURETHANE RESIN BINDER FOR MAGNETIC RECORDING MEDIUMS COMPRISING A POLYCARBONATE POLYOL

[75] Inventors: Masato Endo, Yokohama; Shin Konishi, Fujisawa; Junichi Yamasaki, Yokohama, all of Japan

[73] Assignee: Nippon Polyurethane Industry Co., Ltd., Tokyo, Japan

[21] Appl. No.: 514,537

[22] Filed: Apr. 26, 1990

[30] Foreign Application Priority Data

Apr. 26, 1989 [JP] Japan ................................. 1-106962
May 19, 1989 [JP] Japan ................................. 1-126233

[51] Int. Cl.⁵ ............................................ C08G 18/44
[52] U.S. Cl. ....................................... 528/48; 528/58; 528/71; 528/85; 360/134; 360/135
[58] Field of Search ..................... 528/48, 58, 71, 72, 528/85; 360/134, 135

[56] References Cited

U.S. PATENT DOCUMENTS 4,024,113  5/1977  Ammons ............................... 528/85

*Primary Examiner*—Maurice J. Welsh
*Assistant Examiner*—Rachel Johnson
*Attorney, Agent, or Firm*—Davis Hoxie Faithfull & Hapgood

[57] ABSTRACT

A binder for a magnetic recording medium comprising a hydroxy-group-terminated polyurethane resin prepared by reaction of a polycarbonate-polyol, a chain-extender, and an organic diisocyanate; (A) said polycarbonate-polyol comprising poly(cyclohexane-1,4-dimethanol carbonate)-polyol as a constituting component in an amount of from 20 to 80% by weight, and (B) said chain-extender being a compound having a molecular weight of not more than 1,000 and having two or more amino or hydroxyl groups in the molecule.

41 Claims, No Drawings

POLYURETHANE RESIN BINDER FOR MAGNETIC RECORDING MEDIUMS COMPRISING A POLYCARBONATE POLYOL

BACKGROUND OF THE INVENTION

1. Field of the Invention

The present invention relates to a polyurethane resin binder for magnetic recording mediums. More particularly the present invention relates to a polyurethane resin binder for magnetic recording mediums, used in a magnetic layer formed on a non-magnetic support, which comprises a specified polyurethane and is excellent in dispersion characteristics, electromagnetic transducing characteristics, running durability, and long-term storage durability.

2. Related Background Art

Generally, magnetic recording medium for use in audio apparatuses, video apparatuses, computers, and the like, (specifically those used for audio tapes, video tapes, floppy discs, computer data tapes and the like) are made by forming a magnetic layer by applying a magnetic paint containing magnetic powder, a binder and the like on a non-magnetic support such as a polyester film and drying it.

For the binder for forming the magnetic layer of the magnetic recording mediums, generally used are vinyl chloride resins, polyurethane resins, polyester resins, nitrocellulose resins, epoxy resins, and the like.

Recently, with the expansion of the application fields of magnetic recording mediums such as audio tapes, video tapes, computer data tapes, etc., various performance are demanded therefor. In particular, high reliability of the magnetic recording mediums are increasingly demanded.

More specifically, demanded particularly are adaptability to high-density recording, high-speed long-time running, and long-time driving under high temperature and high humidity conditions, long-term storability, and so on, in order to record and reproduce clear tone and image.

For realizing high-density recording, atomization and high-magnetization of the magnetic powder are intended, and furthermore, increase of packing density of the magnetic powder in the magnetic layer is more and more eagerly intended. However, the increase of the specific area of the magnetic powder resulting from the atomization, and increase of the cohesive power owing to the high-magnetization bring about disadvantages such that dispersion of the magnetic powder becomes so difficult that a conventional binder cannot give sufficient dispersibility and surface properties, and that the increased surface area raises the surface activity of the magnetic powder and affects severely the binder for dispersion of the magnetic powder to cause deterioration of the binder. It also makes difficult the increase of the packing density of the magnetic powder.

On the other hand, a magnetic recording medium is violently contacted with a recording head, rolls, etc. upon recording and reproducing, which may induce wearing or defoliation of the magnetic layer, causing decrease or variation of reproduction output, noise generation, increase of drop-out, increase of the friction coefficient, deffective running properties caused by soiling of the roll with dropped powder, squeeking of the tape, clogging of the magnetic head, or other disadvantageous phenomena.

Furthermore, the countermeasures are required against defoliation of the magnetic layer and sticking of the magnetic layer resulting from deterioration of the magnetic layer caused by the use under high temperature and high humidity conditions or a long-term of storage.

A polyurethane resin is proposed which has high durability useful for a binder system improved in resistance to scratching, wearing, high temperature, and high humidity, giving high-speed running durability, and improved long-term storability. However, the improvement in durability of recording mediums using a known binder is still unsatisfactory, and the binder has not satisfactory properties as a binder for atomized magnetic powder or highly magnetized magnetic powder because of the inferior dispersibility. Thus further improvement is desired.

As describe above, no binder has been developed which exhibits high durability and has sufficient dispersibility for atomized magnetic powder. Thus, a magnetic recording medium is demanded for, which has desired durability, magnetic properties and electromagnetic transducing characteristics. For this purpose, a binder for magnetic recording mediums is demanded, for which are superior in long-term running performance, high-temperature high-humidity long-term running performance, and long-term storage durability and have a greatly improved dispersibility of the magnetic powder and surface properties of the magnetic layer.

SUMMARY OF THE INVENTION

The inventors of the present invention made comprehensive studies to solve the problems involved in the prior art, and have found that a binder comprising a polyurethane resin having a specific structure will give a magnetic recording medium which is superior in durability and has greatly improved surface properties of a magnetic layer, and thus have accomplished the present invention.

The inventors have further found that a binder comprising a polyurethane resin having a specific structure having a hydrophilic polar group will give a magnetic recording medium which is superior in durability and has greatly improved dispersibility of the magnetic powder and surface properties of a magnetic layer, and thus have accomplished the present invention.

It is an object of the present invention to provide a binder for a magnetic recording medium which is superior in durability and has greatly improved dispersibility of the magnetic powder and surface properties of a magnetic layer.

According to one aspect of the present invention, there is provided a binder for a magnetic recording medium comprising a hydroxyl-group-terminated polyurethane resin prepared by reaction of a polycarbonate-polyol, a chain-extender, and an organic diisocyanate: (A) the polycarbonate-polyol comprising poly(cyclohexane-1,4-dimethanol carbonate)polyol as a constituting component in an amount of from 20 to 80% by weight, and (B) the chain-extender being a compound having a molecular weight of not more than 1,000 and having two or more amino or hydroxyl groups in the molecule.

According to another aspect of the present invention, there is provided a binder for a magnetic recording medium comprising a polyurethane resin prepared by reaction of a polycarbonate-polyol, an active hydrogen compound having a hydrophilic polar group, a chainextender, and an organic diisocyanate: (A) the polycarbonate-polyol comprising poly(cyclohexane-1,4-dimethanol carbonate)-polyol as a constituting component in an amount of from 20 to 80% by weight, (C) the active hydrogen compound having at least one of a COOM group, an OH group, an $SO_3M$ group, a $P=O(OM')_2$ group, and a tertiary amino group (where M is hydrogen or an alkali metal and M' is hydrogen, an alkali metal or a hydrocarbon group), and (B) the chain-extender being a compound having a molecular weight of not more than 1,000 and having two or more amino or hydroxyl groups in the molecule.

DETAILED DESCRIPTION OF THE PREFERRED EMBODIMENT

The polycarbonate-polyol constituting the polyurethane of the present invention is derived from an ethanol-releasing condensation reaction of polyhydric alcohol and diethyl carbonate.

The polycarbonate-diol contains poly(cyclohexane-1,4-dimethanolcarbonate)-polyol having a number-average molecular weight of from 500 to 3,000 derived from cyclohexane-1,4-dimethanol (CHDM) in an amount of from 20 to 80% by weight, and other polycarbonate-diol derived from aliphatic glycols as the diol such as 1,6-hexanediol, diethylene glycol, propylene glycol, 1,4-butanediol, 3-methyl-1,5-pentanediol, 1,5-pentanediol, neopentylglycol, 1,8-octanediol, 1,9-nonanediol, 1,10-decanediol, and the like. These aliphatic glycols may be used singly or in combination of the two or more. Among them, 1,6-hexanediol is preferable. The polycarbonate-diol used is derived from the diols and diethyl carbonate, having a number-average molecular weight of from 500 to 3,000, and having terminal hydroxyl groups.

The polycarbonate-diol used in the present invention may be used singly or in combination of the two or more. It may be a copolymer of CHDM with another diol in which CHDM is contained in an amount of from 20 to 80% by weight. The proportion of polycarbonate-diol derived from CHDM in the polyol is in the range of from 20 to 80% by weight. If the proportion is less than 20% by weight satisfactory durability cannot be attained, while if the proportion is more than 80% by weight, the resulting resin has high Tg (glass transition temperature) and is hard and brittle, being not satisfactory in running properties. Thus the preferable range is from 30 to 70% by weight.

The polycarbonate-diol has a number-average molecular weight of from 500 to 3,000, preferably from 700 to 2,500. If the number-average molecular weight of the polycarbonate-diol is lower than 500, the urethane-group concentration in the resulting polyurethane resin is excessively high, leading to low flexibility and poor solvent-solubility of the resin, which is not satisfactory for the binder for magnetic recording mediums. On the other hand, if the number-average molecular weight of the polycarbonate-diol is higher than 3,000, the urethane-group concentration in the resulting polyurethane resin is extremely low, which lowers the wearing resistance and heat resistance of the magnetic recording medium, thus being not satisfactory for use for binders of high durability.

The compound having hydrophilic polar groups in the present invention is such a compound having one or more kinds of hydrophilic polar groups of a COOM group, an OH group, an $SO_3M$ group, a $P=O(OM')_2$ group and a tertiary amino group, where M is hydrogen or an alkali metal and M' is hydrogen, an alkali metal or a hydrocarbon group, and is a diol, a diamine, or a diamine containing one or more of the above-mentioned hydrophilic polar groups in the molecule. The hydrophilic polar groups may be introduced into the polyol chain in a form of a side chain by employing such diol, diamine or aminoalcohol containing hydrophilic polar group as a portion of polyhydric alcohol or dicarboxylic acid being the starting material for the combinedly used polyester-diol, polyesteramide-diol, and the like.

The content of the hydrophilic polar group in the present invention is within the ranges of from 0.001 to 0.50 mmol/g for COOM group, from 0.01 to 1.0 mmol/g for OH group, from 0.001 to 1.0 mmol/g for $SO_3M$ group, from 0.001 to 1.0 mmol/g for $P=O(OM')_2$, and from 0.01 to 3.0 mmol/g for tertiary amine, respectively. At the concentration exceeding the aforementioned range, the viscosity of the polyurethane resin may be extremely high, causing coagulation of the magnetic paint, adversely affecting the dispersibility, and requiring fastidious selection of the solvent, and the durability becomes poor. On the contrary, at the concentration below the aforementioned range, dispersibility of the ferromagnetic powder is not sufficient, hindering achievement of high packing density of the magnetic particles, and giving unsatisfactory surface properties.

The examples of the active hydrogen compounds having a COOM group in the present invention include COOM-group-having glycols such as 2,2-dimethylolpropionic acid, 2,2-dimethylolbutyric acid, 2,2-dimethylolvaleric acid, and the like; and reaction products of a diamine with an acid anhydride such as a carboxyl-group-having compound derived from a reaction of isophoronediamine (IPDA)/phthalic anhydride (molar ratio, 2:1), and the like.

The examples of the active hydrogen compounds having an OH group include glycols having one secondary OH group such as glycerin, ethyleneoxide adduct of glycerin, 1,2,6-hexanetriol, and propyleneoxide adduct of diethanolamine, and the like; glycols having a tertiary OH group in the molecule such as 1,2,3-trihydroxy-2-methylpropane, 1,3,5-trihydroxy-3-methylpentane, 1,2,3,6-tetrahydroxy-2,3-dimethylhexane, and the like and their mixtures; and N-hydroxyethylethylenediamine, 1,3-diamino-2-propanol, and the like.

The examples of the active hydrogen compounds having an $SO_3M$ group include glycols containing an $SO_3M$ group such as sodium 1,4-butanediol-2-sulfonate, potassium 1,4-butane-diol-2-sulfonate, and the like; dicarboxylic acids and their esters containing an $SO_3M$ group such as 5-sodium sulfo-isophthalic acid, 5-potassium sulfo-isophthalic acid, sodium sulfosuccinic acid and alkyl esters thereof, and the like.

The examples of the active hydrogen compounds having a $P=O(OM')_2$ group include sodium 2,3-dihydroxypropyl-phenylphosphonate, potassium bis(2-hydroxyethyl)phosphonate, sodium bis(4-hydroxybutyl)phosphonate, and the like.

The examples of the active hydrogen compounds having a tertiary amino group include N-methyldiethanolamine, N,N-diethanolaniline, N,N-dipropanolaniline, 3-diethylamino-1,2-propanediol, and the like.

The chain extender (B) employed in the present invention is a compound having two or more hydroxyl or amino groups in the molecule and having a molecular weight not more than 1000, including ethylene glycol, 1,3-propylene glycol, 1,2-propylene glycol, 1,4- butanediol, 1,5-pentanediol, cyclohexane-1,4-dimethanol, 1,6-hexanediol, 3-methyl-1,5-pentanediol, neopentylglycol, 1,8-octaneglycol, 1,9-nonanediol, diethylene glycol, cyclohexane-1,4-diol; glycols such as ethylene oxide adducts or propylene oxide adducts of CHDM or bisphenol A, and the like; and diamines and aminoalcohols such as hexamethylenediamine, xylyenediamine, isophoronediamine, monoethanolamine, N,N-dimethylenediamine, and the like. Additionally, water or urea which reacts with isocyanate group to form urea linkage may be employed as the chain extender as shown in Japanese Patent Laid-open Application No. 61-107531. These compounds may be used singly or in combination of two or more thereof.

The organic diisocyanates employed in the present invention include aromatic diisocyanates such as 2,4-tolylene diisocyanate, 2,6-tolylene diisocyanate, 4,4'-diphenylether diisocyanate, 4,4'-diphenylmethane diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, and the like: aliphatic diisocyanates such as tetramethylene diisocyanate, hexamethylene diisocyanate, lysine diisocyanate, and the like; alicyclic diisocyanates such as isophorone diisocyanate, hydrogenated tolylene diisocyanate, hydrogenated diphenylmethane diisocyanate, cyclohexane diisocyanate, and the like; and aralkyl diisocyanates such as xylylene 1,4-diisocyanate, xylylene 1,3-diisocyanate, and the like. Any of these aromatic, aliphatic, alicyclic, and aralkyl diisocyanate may be used. Among them, preferable are alicyclic diisocyanates.

Regarding the molar ratio of the components in the present invention, the molar ratio of the organic diisocyanate relative to the total moles of the hydroxyl-group-terminated polycarbonate-diol (Component (A)) and the chain extender (Component (B)) in the present invention is in the range of NCO/OH ratio of from 0.80 to 1.05, preferably 0.85 to 1.00. The produced hydroxyl-group-terminated polyurethane resin has substantially linear and has hydroxyl groups at the both ends, and has a number-average molecular weight in the range of from 20,000 to 130,000, preferably from 30,000 to 60,000.

If the number-average molecular weight is below 20,000, the resin does not have sufficient film-forming capability and is inferior in durability and surface smoothness in spite of satisfactory dispersibility. If the number-average molecular weight is above 130,000, the dispersibility is low and the viscosity of the paint is high, which may unfavorably cause troubles in mixing and transportation in paint manufacture, and coating application of the paint.

Alternatively, regarding the molar ratio of the components in the present invention, the molar ratio R (isocyanate group/hydroxyl group) of the organic diisocyanate is in the range of from 0.80 to 1.05, preferably 0.85 to 1.00 relative to the total moles of the polycarbonate-polyol (A), the compound (C) of diol, diamine, aminoalcohol, or the like having one or more of the hydrophilic polar groups of a COOM group, an OH group, an $SO_3M$ group, a $P=O\,(OM')_2$ group and a tertiary amino group (where M is hydrogen or an alkali metal and M' is hydrogen, an alkali metal or a hydrocarbon group), and the chain-extender. The binder thus obtained is a polyurethane resin which is linear and has hydroxyl groups at the both ends, and has a number-average molecular weight in the range of from 20,000 to 130,000, preferably from 30,000 to 60,000. If the number-average molecular weight is below 20,000, the resin does not have sufficient film-forming capability and is inferior in durability and surface smoothness in spite of satisfactory dispersibility. If the number-average molecular weight is above 130,000, the dispersibility is low and the viscosity of the paint is high, whereby the workability will be low in mixing and transportation in paint manufacture, and coating application of the paint.

The polyurethane resin in the present invention may be produced by a known process such as bulk polymerization, or solution polymerization. In the bulk polymerization the reaction is carried out in a molten state. In the solution polymerization, the components are reacted in a dissolved state in a solvent: the solvent including a ketone type solvent such as methyl ethyl ketone (MEK), methyl isobutyl ketone (MIBK), cyclohexanone, etc.; an ester type solvent such as ethyl acetate, butyl acetate, etc.; an ether type solvent such as dioxane, tetrahydrofuran, etc.; a glycolether type solvent such as those known as cellosolve, carbitol, etc.; a glycolether acetate type solvent such as cellosolve acetate etc.; an amide type solvent such as dimethylacetamide, dimethylformamide, etc.; an aromatic hydrocarbon solvent such as toluene, xylene, etc.; or an alcohol type solvent such as methanol, ethanol, isopropanol, etc.; or a mixed solvent thereof.

In the manufacture of the polyurethane resin of the present invention, a catalyst and a stabilizer may be employed, if necessary. The catalyst includes, for example, nitrogen-containing compounds such as triethylamine, triethyelnediamine, etc.; and organic metal compounds such as dibutyltin dilaurate, tin octoate, zinc stearate, etc.

The stabilizer which may be used in the present invention includes ultraviolet absorbers such as substituted benzotriazoles, antioxidants such as phenol derivatives, hydrolysis inhibitors, and the like.

Another resin which is usually used for a binder of magnetic recording mediums may be used, if necessary, together with the polyurethane resin of the present invention: the resin including polyurethane resins, vinyl chloride-vinyl acetate type copolymers, polybutylbytyral type resins, cellulose type resins, polyester resins, epoxy resins, phenoxy resins, acrylonitrile-butadiene resins, etc.; unsaturated prepolymers such as urethaneacryl type and polyesteracryl type; electron-radiation-curing type or ultraviolet-curing type resins such as urethaneacryl type, phosphate ester-acryl type, allyl type, etc.

The magnetic powder employed in the present invention includes various ferromagnetic powder, for example, strongly magnetic metal powder containing Fe, Ni, and Co as the main components such as iron oxide magnetic powder e.g., $\gamma$-$Fe_2O_3$, cobalt-containing $\gamma$-$Fe_2O_3$, etc.; $CrO_2$, a hexagonal barium ferrite microparticulate material, Fe, Ni, Co, an Fe-Ni-Co alloy, Fe-Mn-Zn alloy, and the like.

The polyurethane resin of the present invention may be used, in addition to the use for magnetic recording medium, for other uses such as paints, adhesives, sealing agents, water-proofing agents, flooring materials, artificial leather, fiber-treating agents, elastic fibers, cushioning materials, seats, belts, films, rolls, gears, solid tires, vibration insulators, tubes, packing materials, shoe soles (microcellular), and the like.

As mentioned above, the use of the polyurethane resin as a binder, which contains polycarbonate-polyol derived from cyclohexane-1,4-dimethanol at a content of from 20 to 80% by weight, gives characteristics for high-speed long-time running, long-time running at high-temperature and high-humidity, and long-term storage, and greatly improves the surface properties of the magnetic layer.

Furthermore, the use of the polyurethane resin as a binder, which contains a hydrophilic polar group in the resin and is derived by use of a polycarbonate-polyol derived from cyclohexane-1,4-dimethanol, gives characteristics for high-speed long-time running, long-time running at high-temperature and high-humidity, and long-term storage to a magnetic recording medium, and greatly improves the dispersibility of the magnetic powder and the surface properties of the magnetic layer of the magnetic recording medium.

The present invention is explained in more detail by referring to Examples without limiting the invention in any way. The "parts" and "%" in the Examples are based on weight if not specially mentioned.

EXAMPLE 1

In a reaction vessel provided with a thermometer, a stirrer, and a condenser, there are placed 400 parts of polycarbonate-polyol (CHDM-PCD) made from CHDM and having a number-average molecular weight ($\overline{Mn}$) of 2,000; 1,600 parts of polycarbonate-polyol (HG-PCD) made from 1,6-hexaneglycol and having an $\overline{Mn}$ of 2,000; 58 parts of CHDM; 1,100 parts of cyclohexanone; and 0.4 parts of dibutyltin dilaurate (DBTDL) as the polyurethane catalyst, which were mixed at 50° C. Thereafter, isophorone diisocyanate was added thereto at an R (namely NCO/OH ratio) of 0.98 (approximately 261 parts), and the mixture was allowed to react at 80° C. Since the viscosity of the reaction mixture increased with lapse of time, the mixture was diluted from time to time suitably with cyclohexanone and MEK in total amounts of 2,164 parts of MEK and 3,247 parts of cyclohexanone (weight ratio: MEK/cyclohexanone = $\frac{2}{3}$). The synthesis reaction was continued until the solid content of 30% was achieved. The product was transparent pale yellow liquid. This solution of polyurethane resin (PU-1) has a solid content of 30.1%, a viscosity of 3,000 cp at 25° C. The number-average molecular weight of the resin was 30,000.

EXAMPLE 2

The reaction was conducted with the same kinds and amounts of the materials and under the same conditions in the same manner as in Example 1 except that 1,000 parts of CHDM-PCD ($\overline{Mn}$=2,000), and 1,000 parts of HG-PCD ($\overline{Mn}$=2,000) were used. The resulting pale yellow solution of the polyurethane resin (PU-2) had a solid content of 29.6% and a viscosity of 3,200 cp at 25° C.

EXAMPLE 3

The reaction was conducted with the same kinds and amounts of the materials and under the same conditions in the same manner as in Example 1 except that 1,400 parts of CHDM-PCD ($\overline{Mn}$=2,000), and 600 parts of HG-PCD ($\overline{Mn}$=2,000) were used. The resulting pale yellow solution of the polyurethane resin (PU-3) had a solid content of 29.5% and a viscosity of 2,800 cp at 25° C.

EXAMPLE 4

The reaction was conducted with the same kinds and amounts of the materials and under the same conditions in the same manner as in Example 1 except that 500 parts of CHDM-PCD ($\overline{Mn}$=1,000), and 500 parts of HG-PCD ($\overline{Mn}$=1,000) were used. The resulting pale yellow solution of the polyurethane resin (PU-4) had a solid content of 30.2% and a viscosity of 3,600 cp at 25° C.

EXAMPLE 5

The reaction was conducted with the same kinds and amounts of the materials and under the same conditions in the same manner as in Example 1 except that 1,000 parts of CHDM-PCD ($\overline{Mn}$=700), and 700 parts of HG-PCD ($\overline{Mn}$=1,000) were used. The resulting pale yellow solution of the polyurethane resin (PU-5) had a solid content of 30.4% and a viscosity of 2,400 cp at 25° C.

EXAMPLE 6

The reaction was conducted with the same kinds and amounts of the materials and under the same conditions in the same manner as in Example 1 except that 1,000 parts of CHDM-PCD ($\overline{Mn}$=2,500) and 1,000 parts of HG-PCD ($\overline{Mn}$=1,000) were used. The resulting pale yellow solution of the polyurethane resin (PU-6) had a solid content of 30.0% and a viscosity of 3,800 cp at 25° C.

EXAMPLE 7

To 2,000 parts of polycarbonate-polyol ($\overline{Mn}$=2,000) made from a mixture containing 50% each of CHDM and 1,6-hexaneglycol, and 58 parts of CHDM, there was added isophorone diisocyanate to give R of 0.98, and the reaction was carried out in the same manner as Example 1. The resulting pale yellow solution of polyurethane resin (PU-7) had a solid content of 29.9%, and a viscosity of 3,100 cp at 25° C.

COMPARATIVE EXAMPLE 1

The reaction was conducted in the same manner as in Example 1 except that 2,000 parts of HG-PCD ($\overline{Mn}$=2,000) was used as the polycarbonate-polyol. The resulting pale yellow solution of the polyurethane resin (Comparison-1) had a solid content of 29.8% and a viscosity of 2,500 cp at 25° C.

COMPARATIVE EXAMPLE 2

The reaction was conducted in the same manner as in Example 1 except that 2,000 parts of CHDM-PCD ($\overline{Mn}$=2,000) and 1,800 parts of HG-PCD ($\overline{Mn}$=2,000) were used. The resulting pale yellow solution of the polyurethane resin (Comparison-2) had a solid content of 30.1% and a viscosity of 2,900 cp at 25° C.

[Evaluation of Durability of Clear Film]

The respective resins obtained in Examples 1 to 7, and Comparative examples 1 and 2 were tested for the durability.

Preparation of Clear Film:

10 parts of polyisocyanate (Coronate L: Trade name, made by Nippon Polyurethane Industry Co., Ltd.) was added to 100 parts of the resin (the parts being based on non-volatile matter), and the mixture was applied on a sheet of release paper with a knife coater to give a dried film thickness of 100μ. The coated matters were treated at 60° C. for 15 minutes, or at 120° C. for 30 minutes, and subsequently were dry-cured at 25° C. for 3 days to obtain samples for durability evaluation.

Durability Test:

The clear film was cut by a No. 4-dumbbell according to JIS K-6301 to prepare the test specimen, which was left standing for 5 weeks in a thermohygrostat kept at 70° C. and 95% RH. The retention rate of the properties of the film were measured according to the test method of JIS K-6301. The results are shown in Table 1.

Retention Rate:

[(TB (or EB) after test)/(TB (or EB) before test)] × 100

TABLE 1

| No. | | Resin | Before test | | After test | | Retention rate (%) | |
|---|---|---|---|---|---|---|---|---|
| | | | TB | EB | TB | EB | TB | EB |
| Example | 1 | PU-1 | 735 | 260 | 722 | 250 | 98 | 96 |
| Example | 2 | PU-2 | 783 | 250 | 758 | 240 | 97 | 96 |
| Example | 3 | PU-3 | 726 | 210 | 718 | 200 | 99 | 95 |
| Example | 4 | PU-4 | 695 | 230 | 667 | 210 | 96 | 91 |
| Example | 5 | PU-5 | 753 | 210 | 738 | 200 | 98 | 95 |
| Example | 6 | PU-6 | 621 | 320 | 590 | 310 | 95 | 97 |
| Example | 7 | PU-7 | 615 | 380 | 578 | 370 | 94 | 97 |
| Comparative Example | 1 | Comparison 1 | 550 | 400 | 400 | 320 | 73 | 80 |
| Comparative Example | 2 | Comparison 2 | 600 | 350 | 430 | 250 | 72 | 71 |

Note:
TB: Strength at break (Kgf/cm$^2$)
EB: Elongation at break (%)

EXAMPLE 8

In a reaction vessel provided with a thermometer, a stirrer, and a condenser, there were placed 400 parts of polycarbonate-polyol (CHDM-PCD) made from CHDM and having a number-average molecular weight ($\overline{Mn}$) of 2,000; 1,600 parts of polycarbonate-polyol (HG-PCD) made from 1,6-hexaneglycol and having an $\overline{Mn}$ of 2,000; 144 parts of CHDM; 18 parts of dimethylolpropionic acid (DMPA); 1,100 parts of cyclohexanone; and 0.4 parts of DBTDL as the catalyst, which were mixed at 50° C. Thereafter, 464 parts of IPDI (R=0.98) was added thereto, and the mixture was allowed to react at 80° C. Since the viscosity of the reaction mixture increased with lapse of time, the mixture was diluted from time to time suitably with cyclohexanone and MEK in total amounts of 2,460 parts of MEK and 3,690 parts of cyclohexanone (weight ratio: cyclohexanone/MEK=3/2). The product was transparent pale yellow liquid. This solution of polyurethane resin (PU-8) has a solid content of 30.2%, a viscosity of 3,000 cp at 25° C. The number-average molecular weight of the resin was 30,000.

EXAMPLE 9

In the same manner as in Example 8, there were used 1,000 parts of CHDM-PCD ($\overline{Mn}$=2,000), 940 parts of HG-PCD ($\overline{Mn}$=2,000), 60 parts of polycarbonate-polyol (HG-PCD-S) ($\overline{Mn}$=2,000) made from sodium 1,4-butanediol-2-sulfonate containing 0.4 mmol/g of SO$_3$Na group and 1,6-hexanediol, 90 parts of 1,4-butanediol, 1,100 parts of cyclohexane, and 0.4 part of DBTDL, and thereto 491 parts of diphenylmethane diisocyanate was added so as to give R=0.98 to cause reaction. The reaction was carried out in the same manner as in Example 8, by using cyclohexanone and MEK in a weight ratio of 3/2 to obtain a solid content of 30%. Finally the resulting solution of the polyurethane resin (PU-9) had a solid content of 30.1% and a viscosity of 3,200 cp at 25° C.

EXAMPLE 10

The reaction was conducted in the same manner as in Example 8 by using IPDI, CHDM, DBTDL, cyclohexanone, MEK, etc. except that 1,400 parts of CHDM-PCD ($\overline{Mn}$=2,000), 540 parts of HG-PCD ($\overline{Mn}$=2,000), 18 parts of DMPA, 60 parts of HG-PCD-S ($\overline{Mn}$=2,000) were used. The resulting solution of the polyurethane resin (PU-10) had a solid content of 29.8%, and a viscosity of 2,850 cp at 25° C.

EXAMPLE 11

The reaction was conducted in the same manner as in Example 8 by using IPDI, DBTDL, cyclohexanone, MEK, etc. except that 500 parts of CHDM-PCD ($\overline{Mn}$=1,000), 500 parts of HG-PCD ($\overline{Mn}$=1,000), 144 parts of CHDM, 11 parts of DMPA were used. The resulting solution of the polyurethane resin (PU-11) had a solid content of 30.3%, and a viscosity of 3,500 cp at 25° C.

EXAMPLE 12

The synthesis reaction was conducted in the same manner as in Example 8 by using 1,000 parts of CHDM-PCD ($\overline{Mn}$=700), 700 parts of HG-PCD ($\overline{Mn}$=1,000), 153 parts of CHDM, and 65 parts of N-methyldiethanolamine with the same amount of IPDI, DBTDL, cyclohexanone, MEK, etc. as in Example 8. The resulting solution of the polyurethane resin (PU-12) had a solid content of 29.4%, and a viscosity of 2,300 cp at 25° C.

EXAMPLE 13

The synthesis reaction was conducted in the same manner as in Example 8 by using 1,000 parts of CHDM-PCD ($\overline{Mn}$=2,500), 1,000 parts of HG-PCD ($\overline{Mn}$=1,000), 101 parts of CHDM, and 80 parts of 3-diethylamino-1,2-propaneglycol with the same amount of IPDI, DBTDL, cyclohexanone, MEK, etc. as in Example 8. The resulting solution of the polyurethane resin (PU-13) had a solid content of 30.5%, and a viscosity of 3,800 cp at 25° C.

EXAMPLE 14

The synthesis reaction was conducted in the same manner as in Example 8 by using 1,940 parts of polycarbonate-polyol ($\overline{Mn}$=2,000) made from a mixture containing 50% each of CHDM and 1,6-hexaneglycol, 60 parts of the same polycarbonate-polyol made from sodium 1,4-butanediol-2-sulfonate containing 0.4 mmol/g of SO₃Na and 1,6-hexanediol, 58 parts of CHDM, 16 parts of DMPA with the same amount of IPDI, DBTDL, cyclohexanone, MEK, etc. as in Example 8. The resulting solution of the polyurethane resin (PU-14)

thane resin (Comparison-4) had a solid content of 29.7%, and a viscosity of 3,000 cp at 25° C.

The resins prepared in Examples 8–16 and Comparative examples 3 and 4 were evaluated for durability of the clear film as described above. The results are shown in Table 2.

TABLE 2

| No. | | Resin | Before test TB | Before test EB | After test TB | After test EB | Retention rate (%) TB | Retention rate (%) EB |
|---|---|---|---|---|---|---|---|---|
| Example | 8 | PU-8 | 700 | 270 | 650 | 250 | 93 | 93 |
| Example | 9 | PU-9 | 770 | 240 | 730 | 230 | 95 | 96 |
| Example | 10 | PU-10 | 780 | 210 | 730 | 200 | 94 | 95 |
| Example | 11 | PU-11 | 720 | 230 | 690 | 210 | 96 | 91 |
| Example | 12 | PU-12 | 695 | 240 | 653 | 230 | 94 | 96 |
| Example | 13 | PU-13 | 755 | 220 | 732 | 210 | 97 | 95 |
| Example | 14 | PU-14 | 617 | 330 | 580 | 300 | 94 | 91 |
| Example | 15 | PU-15 | 605 | 370 | 563 | 350 | 93 | 95 |
| Example | 16 | PU-16 | 700 | 230 | 644 | 210 | 92 | 95 |
| Comparative Example | 3 | Comparison 3 | 550 | 400 | 418 | 320 | 76 | 80 |
| Comparative Example | 4 | Comparison 4 | 590 | 360 | 460 | 300 | 78 | 83 |

Note:
TB: Strength at break (Kgf/cm²)
EB: Elongation at break (%)

had a solid content of 30.1%, and a viscosity of 3,400 cp at 25° C.

EXAMPLE 15

The synthesis reaction was conducted in the same manner as in Example 8 by using 1,940 parts of polycarbonate-polyol ($\overline{Mn}$=2,000) made from a mixture containing 50% each of CHDM and 1,6-hexaneglycol, 60 parts of the same polycarbonate-polyol made from sodium 1,4-butanediol-2-sulfonate containing 0.4 mmol/g of SO₃Na and 1,6-hexanediol, 58 parts of CHDM, 18 parts of DMPA, and 65 parts of N-methyldiethanolamine with the same amount of IPDI, DBTDL, cyclohexanone, MEK, etc. as in Example 8. The resulting solution of the polyurethane resin (PU-15) had a solid content of 29.9%, and a viscosity of 2,100 cp at 25° C.

EXAMPLE 16

The synthesis reaction was conducted in the same manner as in Example 8 by using 1,000 parts of CHDM-PCD ($\overline{Mn}$=2,500), 1,000 parts of HG-PCD ($\overline{Mn}$=1,000), 101 parts of CHDM, and 80 parts of sodium 2,3-dihydroxypropylphenylphosphonate with the same amount of IPDI, DBTDL, cyclohexanone, MEK, etc. as in Example 8. The resulting solution of the polyurethane resin (PU-16) had a solid content of 30.5%, and a viscosity of 3,800 cp at 25° C.

COMPARATIVE EXAMPLE 3

The synthesis reaction was conducted by using 2,000 parts of HG-PCD ($\overline{Mn}$=2,000) as the polycarbonate-polyol, 144 parts of CHDM, and IPDI to give R=0.98 with the same solvent composition as in Example 8. The resulting solution of the polyurethane resin (Comparison-3) had a solid content of 30.5%, and a viscosity of 2,700 cp at 25° C.

COMPARATIVE EXAMPLE 4

The synthesis reaction was conducted in the same manner as in Comparative example 3 by using 200 parts of CHDM-PCD ($\overline{Mn}$=2,000), and 1,800 parts of HG-PCD ($\overline{Mn}$=2,000) with other materials being the same as in Example 8. The resulting solution of the polyure-

[Evaluation of Magnetic Paint and Magnetic Layer]

APPLICATION EXAMPLE 1

The blended composition for magnetic recording medium as shown below containing the polyurethane resin (PU-1) obtained in Example 1 was dispersed by a bench sand-grind mill (made by Igarashi Kikai K. K.) for 8 hours to prepare a magnetic paint. To the magnetic paint prepared Coronate-L (made by Nippon Polyurethane Industry Co., Ltd.) was added as a curing agent in an amount of 10% as resin by weight relative to the polyurethane resin (A). The mixture was blended for a further one hour, and was then applied on a 12 μm-thick polyethylene terephthlate film so as to give dry thickness of 5 μm under a magnetic field of 2,000 gauss. It was left standing at 60° C. for one day to obtain a magnetic tape. The running characteristics (friction coefficient during running and durability) of the magnetic tape were evaluated by the method described later. The test result is shown in Table 3.

| Blended Composition for Magnetic Recording Medium: | |
|---|---|
| Co-γ-Fe₂O₃ | 100 parts |
| Polyurethane resin (PU-1) (as solid resin) | 25 parts |
| Lecithin | 2 parts |
| Toluene | 110 parts |
| MEK | 110 parts |
| Cyclohexanone | 70 parts |

APPLICATION EXAMPLES 2–7, AND COMPARATIVE APPLICATION EXAMPLES 1–2

Magnetic tapes were prepared in the same manner and in the same formulation as in Application example 1 except that polyurethane resins PU-2 to 7 of Examples 2 to 7 and those of Comparative examples 1 and 2 (Comparative-1, and Comparative-2) were respectively used instead of the polyurethane resin (PU-1) used in Application example 1. The running characteristics of the magnetic tape were evaluated. The results are shown in Table 3.

Change in Dynamic Friction Coefficient during Running:

Change in the dynamic friction coefficient was observed during the running test at 60° C. and 95% RH for 4 weeks by means of a surface property tester (Model HEIDON-14, made by Shinto Kagaku Kiki K. K.).

Durability:

The deterioration (the amount of matter extracted by Soxhlet extraction) after storage at 60° C. and 95% RH for 4 weeks were observed.

TABLE 3

| No. | | Resin | Change in friction coefficient during running* | Durability** |
|---|---|---|---|---|
| Application | 1 | PU-1 | ○ | ⊙ |
| Example | 2 | PU-2 | ○ | ○ |
| | 3 | PU-3 | ○ | ○ |
| | 4 | PU-4 | ○ | ○ |
| | 5 | PU-5 | ○ | ○ |
| | 6 | PU-6 | ○ | ○ |
| | 7 | PU-7 | ○ | ○ |
| Comparative | 1 | Comparison-1 | Δ | X |
| Application Example | 2 | Comparison-2 | Δ | ○ |

Note:
Symbols*
○: Change of not more than 5%.
◎: Change of from 5 to 10%.
Δ: Change of from above 10 to 20%.
X: Change of not less than 20%.
Symbol**
· Percentage of matter extracted by Soxhlet extraction based on a sample
○: Percent of not more than 5%.
◎: Percent of from 5 to 10%.
Δ: Percent of from above 10 to 20%.
X: Percent of not less than 20%.

APPLICATION EXAMPLES 8–16, AND COMPARATIVE APPLICATION EXAMPLES 3–4

Magnetic tapes were prepared in the same manner and in the same formulation as in Application example 1 except that polyurethane resins PU-8 to 16 of Examples 8 to 16 and those of Comparative examples 3 and 4 (Comparative-3, and Comparative-4) were used instead of the polyurethane resin (PU-1) used in Application example 1. The glossiness, (dispersibility), and magnetic tape characteristics of the magnetic tape were evaluated. The results are shown in Table 4. The glossiness decreases with decrease of dispersibility.

The glossiness were determined by use of a coated film prepared by the following manner. A blended composition for magnetic recording medium was dispersed by a bench sand-grind mill (made by Igarashi Kikai K.K.) for 8 hours to prepare a magnetic paint. This magnetic paint was applied onto a 12 μm thick polyethylene terephthalate film so as to obtain a dry thickness of 5 μm of the coating film, and was dried.

Glossiness:

The reflectivity from the surface of the magnetic recording medium was determined by use of a glossmeter at 60° of incident angle and 60° of reflection angle.

TABLE 4

| No. | | Resin | Glossiness | Change in dynamic friction coefficient during running* | Durability** |
|---|---|---|---|---|---|
| Application | 8 | PU-8 | 85 | ○ | ○ |
| Example | 9 | PU-9 | 92 | ○ | ○ |
| | 10 | PU-10 | 95 | ○ | ○ |
| | 11 | PU-11 | 105 | ○ | ○ |
| | 12 | PU-12 | 86 | ○ | ○ |
| | 13 | PU-13 | 83 | ○ | ○ |
| | 14 | PU-14 | 103 | ○ | ○ |
| | 15 | PU-15 | 120 | ○ | ○ |
| | 16 | PU-16 | 85 | ○ | ○ |
| Comparative | 3 | Comparison-3 | 53 | X | Δ |
| Application Example | 4 | Comparison-4 | 64 | Δ | ○ |

Note:
Symbols*
○: Change of not more than 5%.
◎: Change of from 5 to 10%.
Δ: Change of from above 10 to 20%.
X: Change of not less than 20%.
Symbol**
Percentage of matter extracted by Soxhlet extraction based on a sample
○: Percent of not more than 5%.
◎: Percent of from 5 to 10%.
Δ: Percent of from above 10 to 20%.
X: Percent of not less than 20%.

Table 1 and Table 3 clearly show that the polyurethane resin prepared by use of the polycarbonate prepared from cyclohexane-1,4-dimethanol as the polycarbonate-polyol, and the magnetic recording medium employing this polyurethane resin as the binder for a magnetic layer are superior in the durability and the running stability.

The hydroxyl-group-terminated polyurethane resin of the present invention is constituted from a polycarbonate-polyol having a molecular weight of from 500 to 3,000, and a chain-extender, and an organic polyisocyanate, the polycarbonate-polyol comprising cyclohexane-1,4-dimethanol as a constitutional component in an amount of from 20 to 80%. Thereby, the resulting polyurethane resin has excellent durability, and the magnetic recording medium employing this resin as a binder for the magnetic layer has excellent durability and running stability.

Furthermore, Table 2 and Table 4 clearly show that the polyurethane resin having a hydrophilic polar group incorporated therein and prepared by use of a polycarbonate prepared from cyclohexane-1,4-dimethanol as the polycarbonate-polyol, and the magnetic recording medium employing this polyurethane resin as the binder for a magnetic layer are superior in the dispersibility, the durability and the running stability.

As clearly shown above, the polyurethane resin of the present invention, which is prepared by using CHDM as a diol of carbonate polyol component in an amount of from 20 to 80% by weight and using an active hydrogen compound having a hydrophilic polar group, gives improved dispersibility of magnetic powder, and a magnetic recording medium employing this polyurethane resin as a binder for the magnetic layer is excellent is durability, running stability, and the like.

What is claimed is:

1. A binder for a magnetic recording medium comprising a polyurethane resin prepared by reaction of a polycarbonate-polyol derived from an ethanol releasing condensation of a polyhydric alcohol and diethyl carbonate, an active hydrogen compound having one or more hydrophilic polar groups, a chain-extender, and an organic diisocyanate; (A) said polycarbonate-polyol comprising poly(cyclohexane-1,4-dimethanol carbonate)-polyol as a component in an amount of from 20% to 80% by weight or copolymer made from cyclohexane-1,4-diol (CHDM) and another diol wherein CHDM is present in an amount of from 20% to 80% by weight, (C) said hydrophilic polar groups selected from the group consisting of a COOM group, an OH group, an $SO_3M$ group, and a tertiary amino group (where M is hydrogen or an alkali metal), and (B) said chain-extender being a compound having a molecular weight of not more than 1,000 and having two or more amino or hydroxyl groups in the molecule.

2. The binder of claim 1 wherein the polycarbonate-diol contains poly (cyclohexane-1,4-dimethanolcarbonate)-polyol having a number-average molecular weight of from 500 to 3,000 derived from cyclohexane-1,4-dimethanol (CHDM) in an amount of from 20% to 80% by weight, and one or more other polycarbonate-diol derived from aliphatic glycols.

3. The binder of claim 2 wherein the aliphatic glycol is selected from the group consisting of 1,6-hexanediol, diethylene glycol, propylene glycol, 1,4-butanediol, 3-methyl-1,5-pentanediol, 1,5-pentanediol, neopentylglycol, 1,8-octanediol, 1,9-nonanediol, 1,10-decanediol.

4. The binder of claim 1 wherein the polycarbonate-diol is a copolymer of CHDM with another diol in which CHDM is contained in an amount of from 20% to 80% by weight.

5. The binder of claim 3 wherein the aliphatic glycol is 1,6-hexanediol.

6. The binder of claim 5 wherein the binder is prepared by solution polymerization in a cyclohexanone solvent, in the presence of a dibutyltin dilaurate polyurethane catalyst, and wherein the organic diisocyanate is isophorone diisocyanate.

7. The binder of claim 6 further wherein methyl ethyl ketone solvent is added.

8. The binder of claim 1 wherein the organic diisocyanate is alicyclic.

9. The binder of claim 8 wherein the organic diisocyanate is isophorone diisocyanate.

10. The binder of claim 1 wherein a catalyst is employed.

11. The binder of claim 10 wherein the catalyst is dibutyltin dilaurate.

12. The binder of claim 1 wherein the active hydrogen compound is dimethylolpropionic acid.

13. The binder of claim 1 wherein the active hydrogen compound is polyesterdiol derived from 5-sodium sulfo-isophthalic acid or its alkyl ester.

14. The binder of claim 1 wherein the tertiary amino group is N-methyl diethanol amino group.

15. The binder of claim 1 wherein the polycarbonate-polyol has a number average molecular weight of from 500 to 3,000.

16. The binder of claim 1 wherein the hydrophilic polar group is present within the ranges of from 0.001 to 0.50 mmol/g for the COOM group, from 0.01 to 1.0 mmol/g for the OH group, from 0.001 to 1.0 mmol/g for the $SO_3M$ group, and from 0.01 to 3.0 mmol/g for the tertiary amino group.

17. The binder of claim 1 wherein the molar ratio of isocyanate group within the organic diisocyanate relative to the total moles of OH group within the polycarbonate-polyol and the chain-extender is in the range of from 0.8 to 1.05.

18. A binder for a magnetic recording medium comprising a polyurethane resin prepared by reaction of a polycarbonate-polyol, an active hydrogen compound having one or more hydrophilic polar groups, a chain-extender, and an organic diisocyanate; (A) said polycarbonate-polyol comprising poly(cyclohexane-1,4-dimethanol carbonate)-polyol as a component in an amount of from 20% to 80% by weight, (C) said hydrophilic polar groups selected from the group consisting of a COOM group, an OH group, an $SO_3M$ group, and a tertiary amino group (where M is hydrogen or an alkali metal, and (B) said chain-extender being a compound having a molecular weight of not more than 1,000 and having two or more amino or hydroxyl groups in the molecule, wherein the active hydrogen compounds having a COOM group is selected from the group consisting of 2,2-dimethylolpropionic acid, 2,2-dimethylolbutyric acid, 2,2-dimethylolvaleric acid, and reaction products of a diamine with an acid anhydride, said acid anhydride being a carboxyl-group-having compound derived from reaction of isophoronediamine and phthalic anhydride; the active hydrogen compounds having an OH group are selected from the group consisting of glycerin, ethyleneoxide adduct of glycerin, 1,2,6-hexanetriol, propyleneoxide adduct of diethanolamine, 1,2,3-trihydroxy-2-methylpropane, 1,3,5-trihydroxy-3-methylpentane, 1,2,3,6-tetrahydroxy-2,3-dimethylhexane, N-hydroxyethylethylenediamine, and 1,3-diamino-2-propanol; the active hydrogen compounds having an $SO_3M$ group are selected from the group consisting of sodium 1,4-butanediol-2-sulfonate and potassium 1,4-butane-diol-2-sulfonate, 5-sodium sulfo-isophthalic acid, 5-potassium sulfo-isophthalic acid and its alkyl ester, and sodium sulfo-succinic acid and its alkyl ester; the active hydrogen compounds having a tertiary amino group are selected from the group consisting of N-methyl diethanolamine, N,N-diethanolaniline, N,N-dipropanolaniline, and 3-diethylamino-1,2-propanediol; the chain extender is selected from the group consisting of ethylene glycol, 1,3-propylene glycol, 1,2-propylene glycol, 1,4-butanediol, 1,5-pentanediol, 1,6-hexanediol, 3-methyl-1,5-pentanediol, cyclohexane-1,4-dimethanol, neopentylglycol, 1,8-octaneglycol, 1,9-nonanediol, diethylene glycol, cyclohexane-1,4-diol, ethylene oxide adducts and propylene oxide adducts of CHDM or bisphenol A, hexamethylenediamine, xylylenediamine, isophorone diamine, monoethanolamine, N,N-dimethylethylenediamine and water which reacts with an isocyanate group to form a urea linkage; the organic diisocyanate is selected from the group consisting of 2,4-tolylene diisocyanate, 2,6-tolylene diisocyanate, 4,4'-diphenylether diisocyanate, 4,4'-diphenylmethane diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, tetramethylene diisocyanate, hexamethylene diisocyanate, lysine diisocyanate, isophorone diisocyanate, hydrogenated tolylene diisocyanate, hydrogenated diphenylmethane diisocyanate, cyclohexane diisocyanate, xylylene 1,4-diisocyanate, and xylylene 1,3-diisocyanate.

19. A method of making a material useful as a binder for a magnetic recording medium comprising reacting a polycarbonate-polyol derived from an ethanol releasing condensation of a polyhydric alcohol and diethyl carbonate, an active hydrogen compound having one or more hydrophilic polar groups, a chain-extender, and an organic diisocyanate; said polycarbonate-polyol comprising poly(cyclohexane-1,4-dimethanol carbonate)-polyol as a component in an amount of from 20% to 80% by weight or copolymer made from cyclohexane-1,4-diol (CHDM) and another diol wherein CHDM is present in an amount of from 20% to 80% by weight, said hydrophilic polar groups selected from the group consisting of a COOM group, an OH group, an $SO_3M$ group, and a tertiary amino group (where M is hydrogen or an alkali metal, and said chain-extender being a compound having a molecular weight of not more than 1,000 and having two or more amino or hydroxyl groups in the molecule.

20. The method of claim 19 wherein reacting the polycarbonate-polyol, the chain-extender, the active hydrogen compound, and the organic diisocyanate is done in the presence of a catalyst.

21. The method of claim 20 wherein the catalyst is dibutyltin dilaurate.

22. The method of claim 19 wherein reacting the polycarbonate-polyol, the chain-extender, the active hydrogen compound, and the organic diisocyanate is performed by solution polymerization.

23. The method of claim 22 wherein the solution polymerization is performed in a solvent comprising cyclohexanone.

24. A magnetic recording medium comprising a binder comprising a polyurethane resin prepared by reaction of a polycarbonate-polyol derived from an ethanol releasing condensation of a polyhydric alcohol and diethyl carbonate, an active hydrogen compound having one or more hydrophilic polar groups, a chain-extender, and an organic diisocyanate; said polycarbonate-polyol comprising poly(cyclohexane-1,4-dimethanol carbonate)-polyol as a component in an amount of from 20% to 80% by weight or copolymer made from cyclohexane-1,4-diol (CHDM) and another diol wherein CHDM is present in an amount of from 20% to 80% by weight, said hydrophilic polar groups selected from the group consisting of a COOM group, an OH group, an $SO_3M$ group, and a tertiary amino group (where M is hydrogen or an alkali metal), and said chain-extender being a compound having a molecular weight of not more than 1,000 and having two or more amino or hydroxyl groups in the molecule.

25. The medium of claim 24 wherein the polycarbonate-diol contains poly(cyclohexane-1,4-dimethanolcarbonate)-polyol having a number-average molecular weight of from 500 to 3,000 derived from cyclohexane-1,4-dimethanol (CHDM) in an amount of from 20% to 80% by weight, and one or more other polycarbonate-diol derived from aliphatic glycols.

26. The medium of claim 25 wherein the aliphatic glycol is selected from the group consisting of 1,6-hexanediol, diethylene glycol, propylene glycol, 1,4-butanediol, 3-methyl-1,5-pentanediol, 1,5-pentanediol, neopentylglycol, 1,8-octanediol, 1,9-nonanediol, 1,10-decanediol.

27. The medium of claim 24 wherein the polycarbonate-diol is a copolymer of CHDM with another diol in which CHDM is contained in an amount of from 20% to 80% by weight.

28. The medium of claim 26 wherein the aliphatic glycol is 1,6-hexanediol.

29. The medium of claim 28 wherein the binder is prepared by solution polymerization in a cyclohexanone solvent, in the presence of a dibutyltin dilaurate polyurethane catalyst, and wherein the organic diisocyanate is isophorone diisocyanate.

30. The medium of claim 29 further wherein methyl ethyl ketone solvent is added.

31. The medium of claim 24 wherein the organic diisocyanate is alicyclic.

32. The medium of claim 31 wherein the organic diisocyanate is isophorone diisocyanate.

33. The medium of claim 24 wherein a catalyst is employed.

34. The medium of claim 33 wherein the catalyst is dibutyltin dilaurate.

35. The medium of claim 24 wherein the active hydrogen compound is dimethylolpropionic acid.

36. The medium of claim 24 wherein the active hydrogen compound is polyesterdiol derived from 5-sodium sulfo-isophthalic acid or its alkyl ester.

37. The medium of claim 24 wherein the tertiary amino group is N-methyl diethanol amino group.

38. The medium of claim 24 wherein the polycarbonate-polyol has a number average molecular weight of from 500 to 3,000.

39. The medium of claim 24 wherein the hydrophilic polar group is present within the ranges of from 0.001 to 0.50 mmol/g for the COOM group, from 0.01 to 1.0 mmol/g for the OH group, from 0.001 to 1.0 mmol/g for the $SO_3M$ group, and from 0.01 to 3.0 mmol/g for the tertiary amino group.

40. The medium of claim 24 wherein the molar ratio of isocyanate group within the organic diisocyanate relative to the total moles of OH group within the polycarbonate-polyol and the chainextender is in the range of from 0.8 to 1.05.

41. A magnetic recording medium comprising a binder comprising a polyurethane resin prepared by reaction of a polycarbonate-polyol, an active hydrogen compound having one or more hydrophilic polar groups, a chain-extender, and an organic diisocyanate; said polycarbonate-polyol comprising poly(cyclohexane-1,4-dimethanol carbonate)-polyol as a component in an amount of from 20% to 80% by weight or copolymer made from cyclohexane-1,4-diol (CHDM) and another diol wherein CHDM is present in an amount of from 20% to 80% by weight, said hydrophilic polar groups selected from the group consisting of a COOM group, an OH group, an $SO_3M$ group, and a tertiary amino group (where M is hydrogen or an alkali metal), and said chain-extender being a compound having a molecular weight of not more than 1,000 and having two or more amino or hydroxyl groups in the molecule, wherein the active hydrogen compounds having a COOM group is selected from the group consisting of 2,2-dimethylolpropionic acid, 2,2-dimethylolbutyric acid, 2,2-dimethylolvaleric acid, and reaction products of a diamine with an acid anhydride, said acid anhydride being a carboxyl-group-having compound derived from reaction of isophoronediamine and phthalic anhydride; the active hydrogen compounds having an OH group are selected from the group consisting of glycerin, ethyleneoxide adduct of glycerin, 1,2,6 hexanetriol, propyleneoxide adduct of diethanolamine, 1,2,3-trihydroxy-2-methylpropane, 1,3,5-trihydroxy-3-methylpentane, 1,2,3,6-tetrahydroxy-2,3-dimethylhexane, N-hydroxyethylethylenediamine, and 1,3-diamino-2-propanol; the active hydrogen compounds having an $SO_3M$ group are selected from the group consisting of sodium 1,4-butanediol-2-sulfonate and potassium 1,4-butane-diol-2-sulfonate, 5-sodium sulfo-isophthalic acid, 5-potassium sulfo-isophthalic acid and its alkyl ester, and sodium sulfo-succinic acid and its alkyl ester; the active hydrogen compounds having a tertiary amino group are selected from the group consisting of N-methyl diethanolamine, N,N-diethanolaniline, N,N-dipropanolaniline, and 3-diethylamino-1,2-propanediol; the chain extender is selected from the group consisting of ethylene glycol, 1,3propylene glycol, 1,2-propylene glycol, 1,4-butanediol, 1,5pentanediol, 1,6-hexanediol, 3-methyl-1,5-pentanediol, cyclohexane-1,4-dimethanol, neopentylglycol, 1,8-octaneglycol, 1,9-nonanediol, diethylene glycol, cyclohexane-1,4-diol, ethylene oxide adducts and propylene oxide adducts of CHDM or bisphenol A, hexamethylenediamine, xylylenediamine, isophorone diamine, monoethanolamine, N,N-dimethylethylenediamine and water which reacts with an isocyanate group to form a urea linkage; the organic diisocyanate is selected from the group consisting of 2,4-tolylene diisocyanate, 2,6-tolylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, 3,3-dimethoxydiphenyl-4,4-diisocyanate, tetramethylene diisocyanate, hexamethylene diisocyanate, lysine diisocyanate, isophorone diisocyanate, hydrogenated tolylene diisocyanate, hydrogenated diphenylmethane diisocyanate, cyclohexane diisocyanate, xylylene 1,4-diisocyanate, and xylylene 1,3-diisocyanate.

* * * * *